March 11, 1958 R. L. PEASE 2,826,644

RECEIVING APPARATUS FOR RADIO SIGNALS

Filed Jan. 24, 1955

INVENTOR.
RICHARD L. PEASE
BY
[signature]
ATTORNEY

United States Patent Office
2,826,644
Patented Mar. 11, 1958

2,826,644

RECEIVING APPARATUS FOR RADIO SIGNALS

Richard L. Pease, Wauwatosa, Wis.

Application January 24, 1955, Serial No. 483,750

1 Claim. (Cl. 179—107)

This invention relates to a receiving apparatus for radio signals.

In my prior patent for Receiving Apparatus for Radio Signals, No. 2,544,102 of March 6, 1951, I provided an apparatus which utilized a novel form of plug which was adapted to be plugged into the ordinary radio receiver of an airplane and which was provided with a volume control at the outer end of the plug so that the aviator could control the volume for his ear phone independently of the control for any other ear phone that might be attached to the receiving set of the plane.

In addition to this, in my prior patent I provided an ear mold connected mechanically with the small telephone receiver so that the sound was led directly into the auditory canal of the aviator's ear and in this way a marked reduction in disturbing sounds was obtained since the volume required for the signal was very low and since external sounds were effectively cut-off and were not superimposed on the signal as was the case where the ordinary ear phones provided with cups were employed.

As the size of airplanes increased it frequently happened that the pilot was located at a considerable distance from the radio receiver and consequently it was impossible for him to utilize the individual volume control on the plug directly plugged into the radio receiver itself. Instead, relatively heavy cables led from the radio receiver to the pilot and the co-pilot and with these heavy cords or cables it was impossible to attach them directly to the small ear phones attached to the molded plastic ear molds.

This invention is designed to overcome the above noted defects and objects of this invention are to provide a novel form of receiving apparatus for radio signals in which the control is obtained by control means attached directly to the pocket of the aviator's shirt or jacket, in which the relatively heavy cable leading from the radio receiver to the pilot is utilized to maintain the control unit in an upright position clipped or detachably fastened to the pocket of the aviator's jacket, and in which a very small lightweight cord or cable detachably attached to the control unit leads directly from the control unit to the miniature ear phone of the pilot.

Further specific objects are to provide a control unit with a downwardly projecting plug rigidly carried by the control unit itself and arranged to detachably receive the socket of the relatively heavy extension cable or cord leading from the radio receiver. In this way it is possible for each aviator to have his individual control unit which can be quickly attached to and detached from the relatively heavy cable leading from the receiving set in the plane. With this arrangement each pilot can individually adjust the volume to his particular needs without disturbing the adjustment for the other pilot, and each pilot is thus provided with a separate control means and ear mold which is kept for his own private or individual use.

A further object is to provide a construction which is very simple and economical to make and which is always in a position so that it may be readily adjusted by the adjustment of its own individual rheostat to thus independently control the volume, and in which the vertical position of the apparatus itself is maintained automatically by the weight of the relatively heavy cable so that only one hand of the pilot is needed in making the adjustment.

An embodiment of the invention is shown in the accompanying drawings in which.

Figures 1, 2, 3, 4:
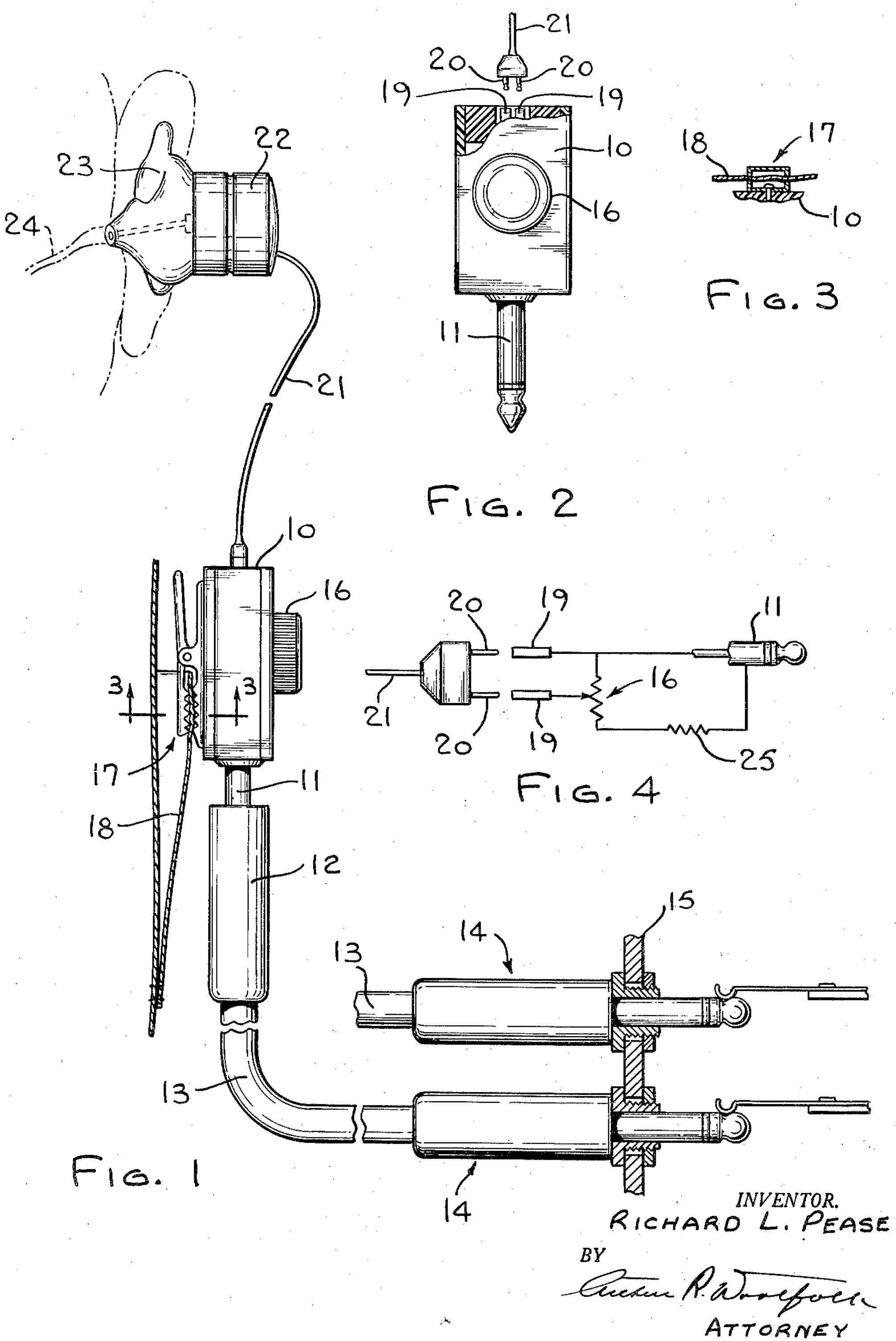
Figure 1 is a view showing the ear phone in place, the ear being shown in dotted lines, and showing the control means and plug in their correct positions.
Figure 2 is a face view of the control unit with parts broken away.
Figure 3 is a line section on the line 3—3 of Figure 1.
Figure 4 is a wiring diagram of the control unit.

Referring to the drawings it will be seen that the control unit 10 is a boxlike structure which is formed of insulating material and is provided with a downwardly projecting plug 11 adapted to receive the socket 12 of the relatively heavy cable 13 which extends from the plug indicated generally at 14 adapted to be inserted in the jack of the receiver 15 of the plane. The receiver 15 is arranged to receive two or more plugs for the pilot and co-pilot. The control unit 10 is provided with a rheostat 16 adjustable from the outer side of the box 10. The inner side of the box or control unit 10 is provided with a spring clip indicated generally at 17 which is adapted to be clipped or detachably secured to the pocket 18 of the aviator's jacket or shirt. The upper portion of the control unit 10 is provided with a pair of contacts 19 which are engaged by the prongs 20 of the relatively light cord or cable 21 which leads to the miniature ear phone 22. This miniature ear phone 22 is provided with a molded ear plug 23, as in my prior patent, which fits within the aviator's ear and leads the sound directly into the auditory canal 24 of his ear.

The wiring diagram of the control unit is shown in Figure 4. The rheostat 16 is bridged across the terminals of the plug 11 of the control unit and is preferably connected in series with a protecting resistor or limiting resistor 25. The terminals of the rheostat are connected to the small contacts 19, 19 of the control unit. If desired, the limiting or protecting resistor 25 may be connected between the rheostat and one of the contacts 19. Either the arrangement shown in Figure 4 or that described immediately hereinabove could be employed without departing from the invention.

It is to be noted particularly that the relatively heavy cord 13 pulls downwardly on the plug 11 of the control unit 10 and thus holds the control unit securely in its vertical position on the shirt or jacket of the aviator, the spring clip 17 locking it to the pocket 18 of the jacket. It is therefore clear that the aviator does not have to use two hands in the adjustment of the rheostat but requires only one hand to turn the knob thereof to the desired position, as the control unit 10 itself is held in its correct vertical position against any turning tendency during the adjustment. In other words advantage is taken of the stiffness and weight of the extension cord for the extension cord is rigidly attached to the downwardly extending plug of the control unit and projects directly downwardly therefrom and holds the control unit in its vertical position.

When the aviator leaves the plane all that is necessary is to detach the socket 12 of the extension cord 13 from the plug 11 of the control unit. The aviator then leaves his private or individual control unit clipped to his pocket and places the miniature receiver 22 and the ear mold 23 in his pocket.

It is obvious that when he again arrives at the plane it is a simple matter to insert the plug 11 into the socket 12 of the extension cord and adjust his individual control unit to suit his exact requirements. Thus no matter how great a distance the pilot is from the receiver in the plane he nevertheless can individually adjust his control unit to his preferred volume independently of any other adjustment.

Further than this, each aviator is provided with his individual control unit.

Although this invention has been described in considerable detail, it is to be understood that such description is intended as illustrative rather than limiting, as the invention may be variously embodied and is to be interpreted as claimed.

I claim:

A control unit for a radio receiver comprising a body portion having attaching means on one side adapted to detachably attach said body portion to the pocket of a user with the body portion on the outer side of the pocket, a downwardly extending coupling member projecting below said body portion and rigidly attached to said body portion for coupling to a relatively large and heavy cable leading downwardly from said body portion to a radio receiver and arranged to hold said body portion in an upright position, said body portion having a miniature coupling member at its upper end for coupling to a relatively small and light cable leading upwardly to an ear phone, and a volume-control rheostat carried by said body portion and electrically interposed between the two cables and having a control knob located outside of said body portion and on that side opposite the attaching means.

References Cited in the file of this patent

UNITED STATES PATENTS

| | | |
|---|---|---|
| 1,973,410 | Greibach | Sept. 11, 1934 |
| 2,564,425 | Corso et al. | Aug. 14, 1951 |